D. LUSE.
Portable-Jack for Motive-Powers.

No. 206,804. Patented Aug. 6, 1878.

Attest:
H. D. Perrine
Daniel Breed

Inventor
Dennis Luse
by Cm. Parks
Atty.

UNITED STATES PATENT OFFICE.

DENNIS LUSE, OF MILLHEIM, PENNSYLVANIA.

IMPROVEMENT IN PORTABLE JACKS FOR MOTIVE POWERS.

Specification forming part of Letters Patent No. 206,804, dated August 6, 1878; application filed June 15, 1878.

*To all whom it may concern:*

Be it known that I, DENNIS LUSE, of Millheim, Centre county, Pennsylvania, have invented an Improvement in Reversible Jacks for Motive Powers; and I do hereby declare the following to be a full and correct description of the same, reference being had to the accompanying drawings, in which—

Figure 1:
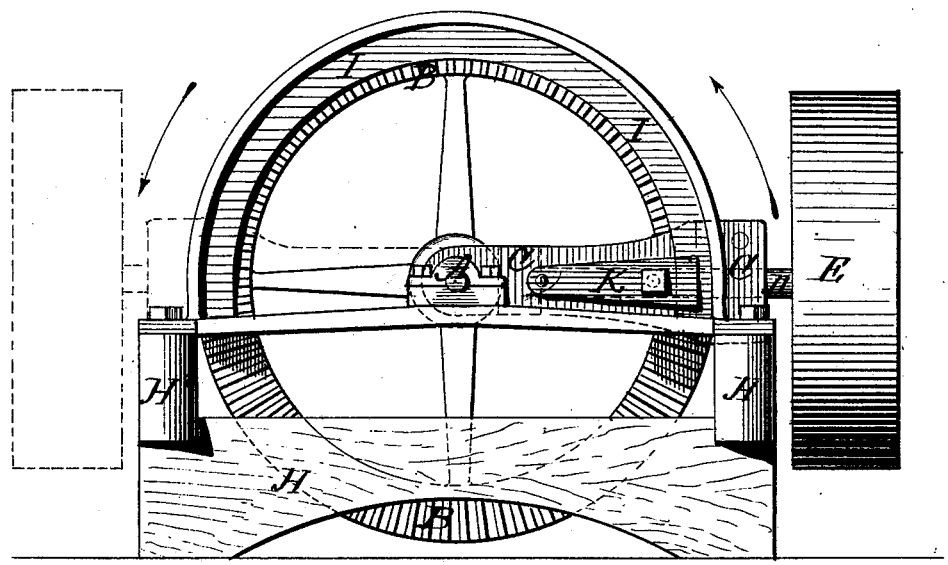
Figure 2:
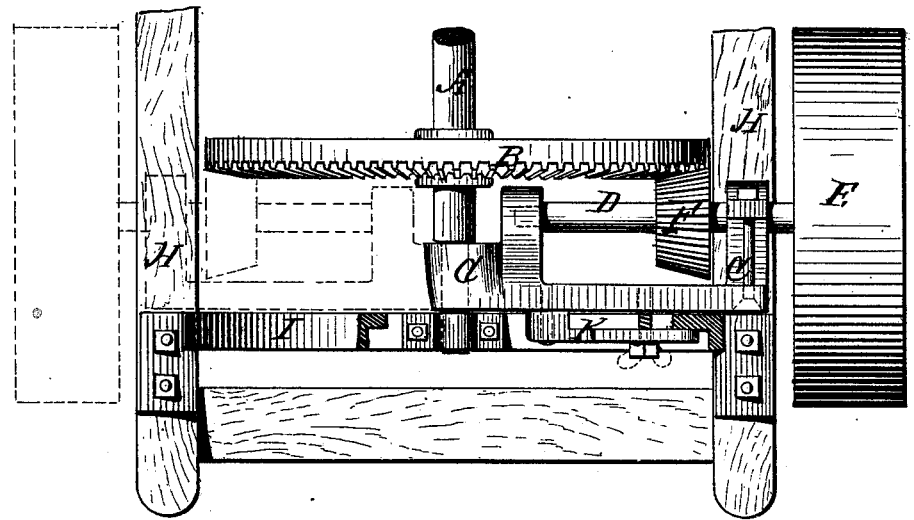

Figure 1 is an elevation, and Fig. 2 is a front view.

My invention relates to a jack for attaching to machinery for adjusting the belt, especially the horse-power of thrashing-machines; and it consists in applying to the driving-shaft of a power, and revolving about it, a yoke which carries the shaft of a belt-driving wheel, and adjusting said yoke upon a segment at any required angle, so that the belt may be regulated as desired.

In the drawings, A is the driving-shaft of any power, upon which is a bevel-wheel, B. Upon the shaft A is the yoke C, having bearings for the shaft D, carrying the belt-pulley E. Upon the shaft D is the bevel-wheel F, engaging the bevel-wheel B.

The yoke C is hung at one end on the driving-shaft A, and is free to revolve around it, so that in its revolution it will form a circle concentric with the wheel B. Secured upon the frame H is a segmental rim, I, against which the yoke C, carrying the shaft D and wheel E, slides. A clamp, K, upon the yoke C, serves to fasten the yoke C at any place upon the segment I, and so hold the shaft D and wheel E in any position.

The operation of my device is as follows: Power being applied to the shaft A and wheel B, it, in turn, revolves the shaft D and band-wheel E by means of the bevel-wheel F. When the wheel E is situated upon one side of the driving-shaft A, as seen in the figures, the band or belt upon the wheel E will run in a certain direction and position; but if the yoke C should be revolved around the driving-shaft A, so as to bring the wheel E to the opposite side, as shown in the dotted lines in the drawings, it is obvious that the belt-wheel E would run in an opposite direction and in a different position; and it is also obvious that the yoke C may be secured at any point on the segment I, and be made to operate in any position on said segment I.

Having thus fully described my invention, what I claim, and desire to secure by Letters Patent, is—

The driving-shaft A and wheel B, yoke C, carrying the shaft D, wheel F, and wheel E, in combination with the segmental rim I and clamp K, as and for the purpose set forth.

The above specification of said invention signed and witnessed, at Millheim, Pennsylvania, this 8th day of June, A. D. 1878.

DENNIS LUSE.

Witnesses:
 J. W. STAM,
 CHAS. H. HILD.